United States Patent [19]

McCarthy et al.

[11] Patent Number: 4,593,651

[45] Date of Patent: Jun. 10, 1986

[54] LIVESTOCK FEED CONVEYOR INCLUDING PROVISION FOR MULTIPLE FEEDER BUNKS

[75] Inventors: Michael D. McCarthy, New Holstein; Keith H. Rhodes, Winneconne, both of Wis.

[73] Assignee: Metko, Inc., New Holstein, Wis.

[21] Appl. No.: 659,171

[22] Filed: Oct. 9, 1984

[51] Int. Cl.⁴ .................... A01K 5/02; B65G 47/46
[52] U.S. Cl. .............................. 119/52 B; 198/364
[58] Field of Search ...................... 119/52 B; 198/364

[56] References Cited

U.S. PATENT DOCUMENTS

| | | | |
|---|---|---|---|
| 4,213,525 | 7/1980 | Scheppele | 198/364 |
| 4,320,825 | 3/1982 | Buschbom et al. | 198/360 |
| 4,381,733 | 5/1983 | Patz et al. | 119/52 B |

FOREIGN PATENT DOCUMENTS 867668  1/1953  Fed. Rep. of Germany ...... 198/364

*Primary Examiner*—Hugh R. Chamblee
*Attorney, Agent, or Firm*—Nicholas A. Kees

[57] ABSTRACT

Disclosed is a feed conveyor for receiving feed and depositing it into a feeder bunk. It includes a hopper for receiving feed and depositing it upon a motor-run belt conveyor. Disposed between the upper or load-carrying flight and the lower or return flight of the conveyor belt are pulleys over which is reeved a cable, rope or chain in a horizontal plane, that is, each cable flight is located laterally with respect to the opposite flight. These pulleys are run by a drive taken from the same motor as that driving the belt of the conveyor via pulleys which transfer the plane of the drive belt from the vertical to the horizontal. The cable joined into a continuous loop by a cable clamp having holes drilled in one face thereof for insertion of the cable ends and a concave semi-cylindrical depression formed in the same face so as to match closely the radius of the pulleys driving the cable. Pivotably attached to this cable clamp is a trolley which a caused to slide back and forth along the length of the conveyor frame just beneath the conveyor belt. In one embodiment the plow is fixed at a particular angle via pegs which fit in holes in the trolley, and the plow can be switched manually by placing it in a different set of holes to plow the feed off the opposite side of the conveyor. In another embodiment, the plow is an A-shaped assembly having spring-loaded over-centering means and having latch means for semi-automatically switching the plow from one side to the other. In yet another embodiment the direction of movement of the plow is switched by taking the drive force of the cable from first one and then the other of two pulleys turning in opposite directions and run by the same belt and drive pulley.

43 Claims, 10 Drawing Figures

LIVESTOCK FEED CONVEYOR INCLUDING PROVISION FOR MULTIPLE FEEDER BUNKS

BACKGROUND OF THE INVENTION

This invention relates to livestock feeders and feed conveyors, and particularly to such conveyors which distribute feed to bunks located in several different locations.

Of course conveyors for conveying feed to livestock are well known. Recently they have included a conveyor belt positioned over the feeder bunk and often just to one side of the center line of the bunk. A silo unloader or other feed source drops feed onto the belt at one end and the belt conveys the feed away from that end. As the conveyor moves the feed along the bunk, a plow may move back and forth along the conveyor forcing the feed off the side of the belt into the bunk. Examples of this arrangement are shown in Patz, U.S. Pat. No. 4,381,734 and in Sweeney, U.S. Pat. No. 4,387,799.

These prior conveyors, however, had certain inherent disadvantages. For instance, generally the plow described above is attached to and moved by a vertical pulley system, that is, a system wherein the plane of the cables, chains or ropes driving the plow is vertical. In other words, one flight of the cable is located directly above the other. In the Patz patent described above this system is above the conveyor surface and exposes itself to the possibility of injuring livestock and operators of the system, and necessitates additional guards to avoid these hazards. Other feed conveyors employ a similar vertical system located beneath the conveyor, but these conveyors have an excessively large cross-sectional height and require a substantial amount of ceiling clearance inside the building, or require a large opening to be made in order to pass through a vertical divider such as a wall. Moreover there is a need in the marketplace for feed conveyor systems which can deliver feed to split lots and to multiple lots. Neither of the above described patents discloses such a feeder.

This invention relates to improvements to the abovedescribed systems and to solutions to the problems raised thereby.

SUMMARY OF THE INVENTION

This invention includes a conventional hopper for receiving feed and depositing it upon a conventional motor-run belt conveyor. Disposed between the upper or load-carrying flight and the lower or return flight of the conveyor belt are pulleys over which is reeved a cable, rope or chain in a horizontal plane, that is, each cable flight is located laterally with respect to the opposite flight. These pulleys are run by a drive taken from the same motor as that driving the belt of the conveyor via pulleys which transfer the plane of the drive belt from the vertical to the horizontal. The means used to join this cable into a continuous loop is preferably a block of material having holes drilled in one face thereof for insertion of the cable ends and a concave semi-cylindrical depression formed in the same face so as to match closely the radius of the pulleys driving the cable. Pivotably attached to this joining means for this cable is a trolley which a caused to slide back and forth along the length of the conveyor frame just beneath the conveyor belt. In one embodiment the plow is fixed at a particular angle via pegs which fit in holes in the trolley, and the plow can be switched manually by placing it in a different set of holes to plow the feed off the opposite side of the conveyor. In another embodiment, the plow is an A-shaped assembly having spring-loaded over-centering means and having latch means for semi-automatically switching the plow from one side to the other. In yet another embodiment the direction of movement of the plow is switched by taking the drive force of the cable from first one and then the other of two pulleys turning in opposite directions and run by the same belt and drive pulley. By proper use of the parts described herein which make up this system, it has been made possible to change an apparatus easily from a conveyor to a feeder and to add features later to handle split lot feeding and indeed even multi-lot feeding.

It is therefore an object of this invention to provide a feed conveyor having a cable and pulley assembly mounted so that the cable lies in a horizontal plane between the flights of the conveyor belt for moving the plow.

Another object of the invention is to provide a feed conveyor wherein the conveyor belt and plow are both powered by the same motor, and that motor not being required to be of the reversing type.

Still another object of the invention is to provide a feed conveyor having a reduced cross-sectional height and reduced amount of movement in accomplishing the transition in plow movement from one direction to the other.

It is another object of the invention to provide a feed conveyor as described above wherein the direction that the plow forces feed off the conveyor can be changed manually by fitting the plow into different sets of holes in the trolley carrying the plow.

Yet another object of the invention is to provide a feed conveyor as described above wherein the plow is A-shaped and switches from one side to the other by means of latches disposed along the conveyor.

A more specific object of the invention is to provide a feed conveyor wherein the direction of movement of the plow along the length of the conveyor can be changed by taking drive force from first one and then the other of two pulleys that are turning in opposite directions but run by the same motor.

Other objects and advantages of the invention will become apparent hereinafter.

DESCRIPTION OF THE PREFERRED EMBODIMENT

For purposes of this application, including the claims thereof, any reference to a pulley-and-belt arrangement includes a chain-and-sprocket arrangement. Further, any reference to a "vertical" pulley arrangement or orientation means that the two flights of the belt are located one above the other and the shaft of the pulley is horizontal, while any reference to a "horizontal" pulley arrangement or orientation means that the two flights of the belt are located one alongside of the other and that the shaft of the pulley is vertical.

Figure 1:
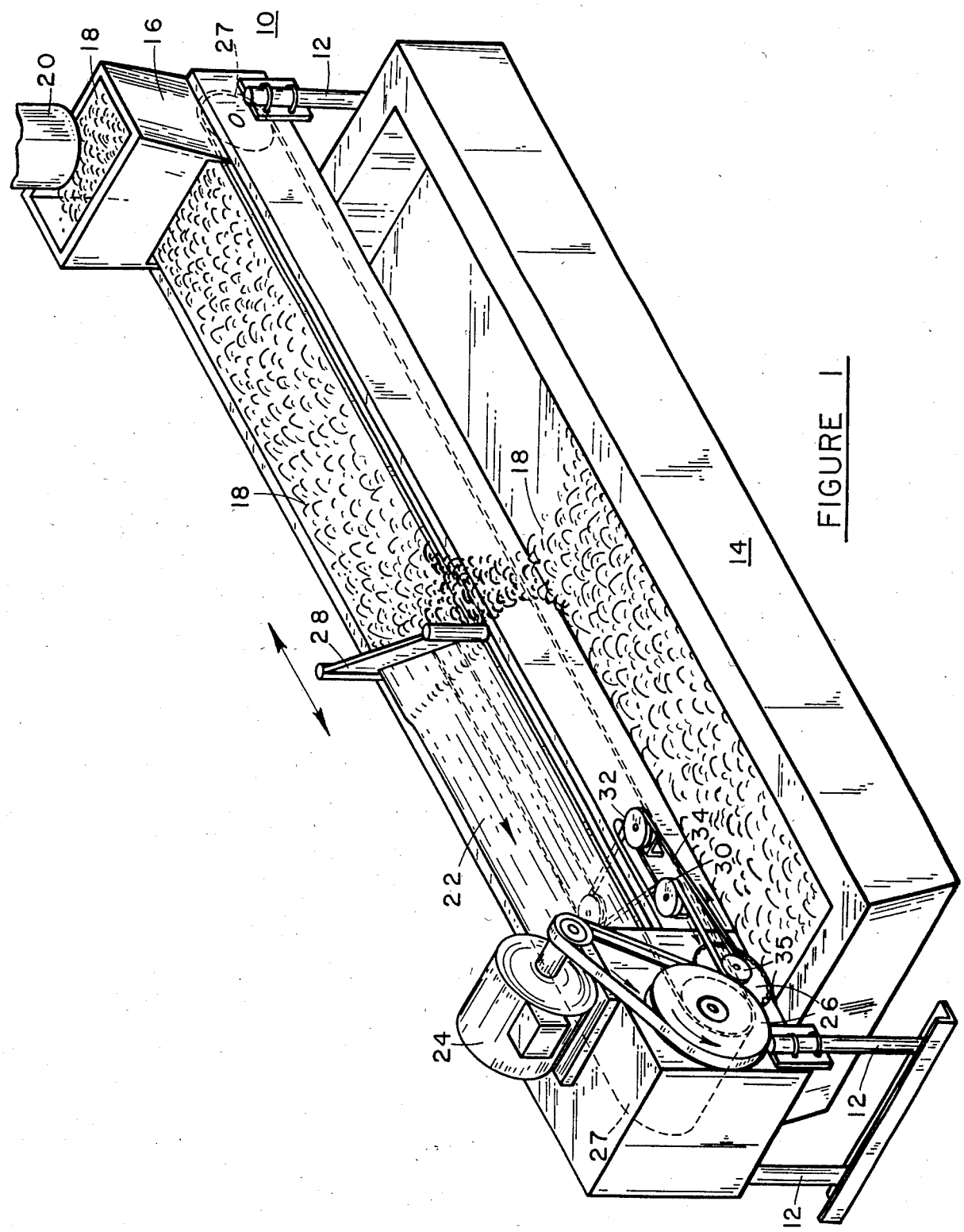
FIG. 1 is an isometric view of a feeder showing an embodiment of the invention.

Referring now to FIG. 1, the feeder, referred to generally as 10, is supported over the feeder bunk 14 by support means such as legs 12. Legs 12 are attached to the feeder 10 and can support it by extending downward and resting on the floor or lower surface as shown in FIG. 1. Alternatively, legs 12 can also extend upwardly and be attached to a ceiling or other upper surface (not shown), or laterally so as to be attached to a nearby wall or other vertical support surface (not shown) so that the feeder 12 is suspended generally over bunk 14.

As shown in isometric in FIG. 1, feeder 10 includes hopper means 16 at one end for receiving feed 18 from a feed dispensing means 20. Practically speaking, feed 18 is generally silage while feed dispensing means 20 is a tube connected to a silo unloader (not shown), or to another conveyor (not shown) which receives feed from a silo unloader, although the invention need not necessarily be so limited. Feed 18 is then deposited in hopper means 16 and in turn onto the upper support surface of a conveyor belt 22, which in turn begins to carry feed 18 away from hopper means 16 and over feed bunk 14. The upper support surface of belt 22 is generally not flat but rather concave so as to allow it to carry more feed than if it were flat. Belt 22 is a continuous belt, and is driven by any suitable drive means such as a motor 24 via speed reducing means 26 which may include pulleys, sprockets, and/or gears run by belts and/or chains, or any suitable combination thereof, connected to motor 24. The speed reducing means is connected to one of a pair of support rollers 27 (shown in phantom) over which conveyor belt 22 is reeved. Preferably motor 24 is placed on the end of feeder 10 opposite to hopper means 16, although such placement is not required. A plow 28 having a diagonal blade surface resting on the upper support surface of belt 22 can then be caused to move back and forth along the length of feeder 10 to smoothly push and deflect the feed off the side of the feeder 10 and into bunk 14. In the embodiment shown in FIG. 1, the means for moving plow 28 back and forth includes idler pulley 30 and 32 on which runs a belt 34 which in turn is driven by a pulley 35 as part of speed reducing means 26.

Figure 2:
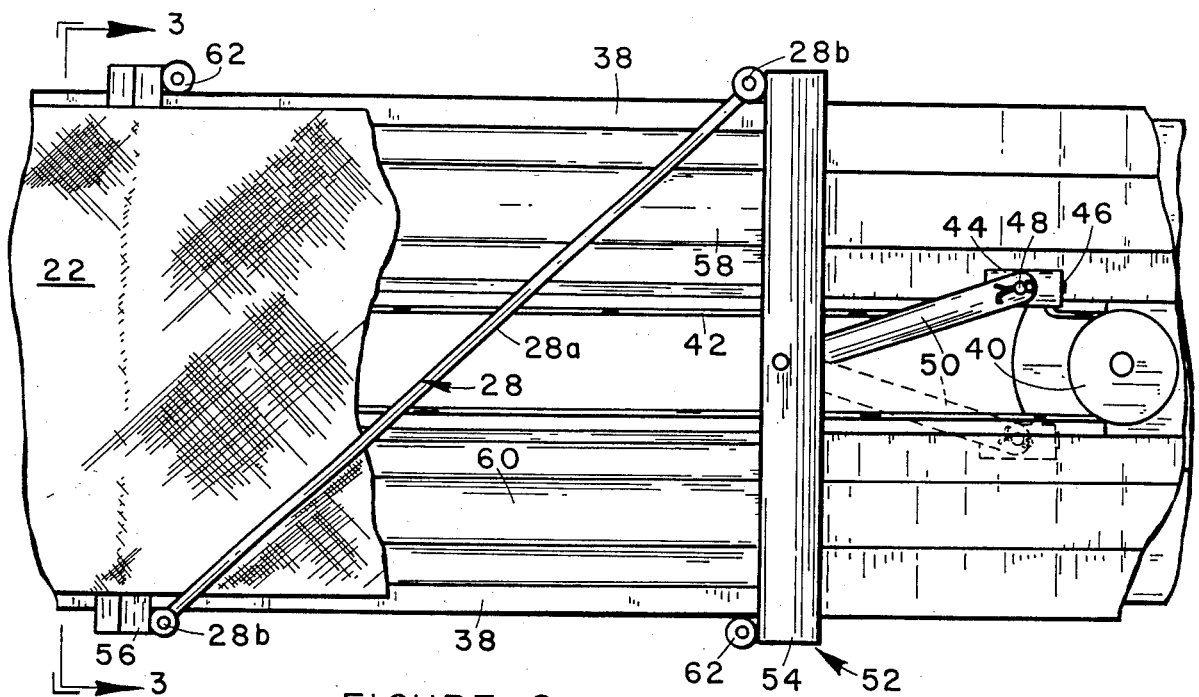
FIG. 2 is a top fragmentary view of the embodiment shown in FIG. 1 with the conveyor belt partially cut away.
Figure 3:
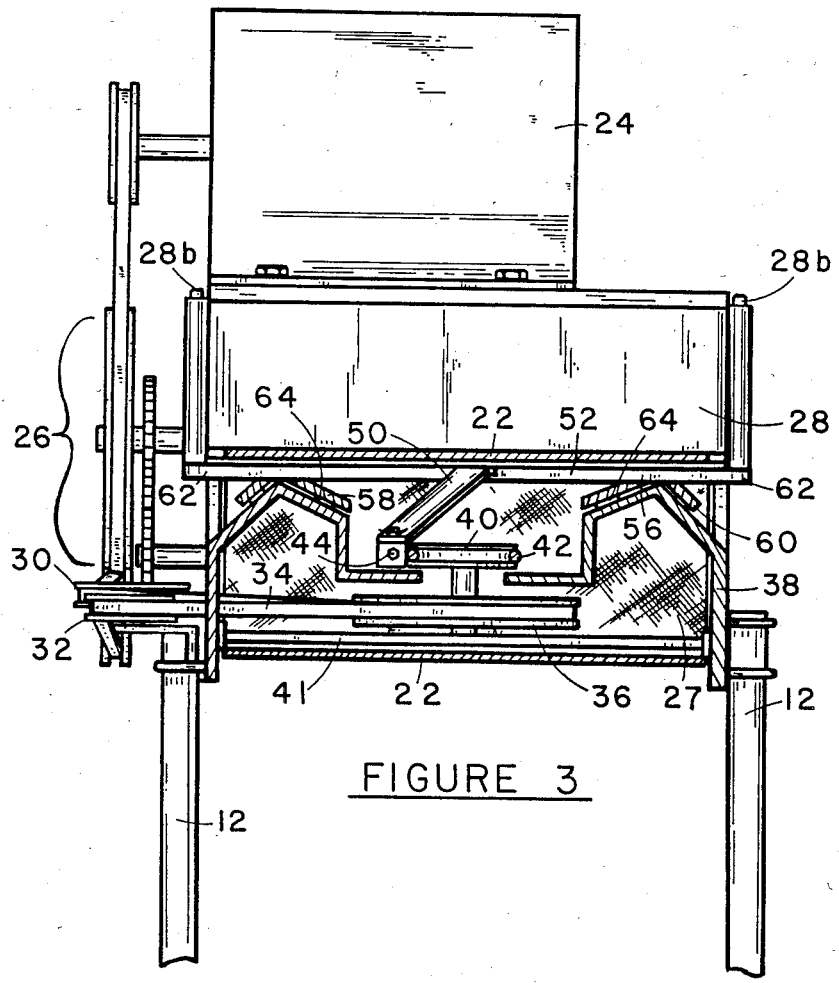
FIG. 3 is a sectional view of FIG. 2 taken along line 3—3.

The means for moving plow 28 back and forth along the length of feeder 10 is shown more clearly in FIGS. 2 and 3. Referring now to those drawing figures, FIG. 3 again shows motor 24, speed reducing means 26, pulley 30 and 32, and belt 34. It further shows the completion of the path of belt 34, that is, about yet another pulley 36. Pulley 36 drives another pulley 40, and both may be journaled to a bracket 41 attached between the two sides of frame 38. A cable 42 is attached around pulley 40 and a similar but freewheeling pulley (not shown) on the opposite end of feeder 10.

Figure 4:
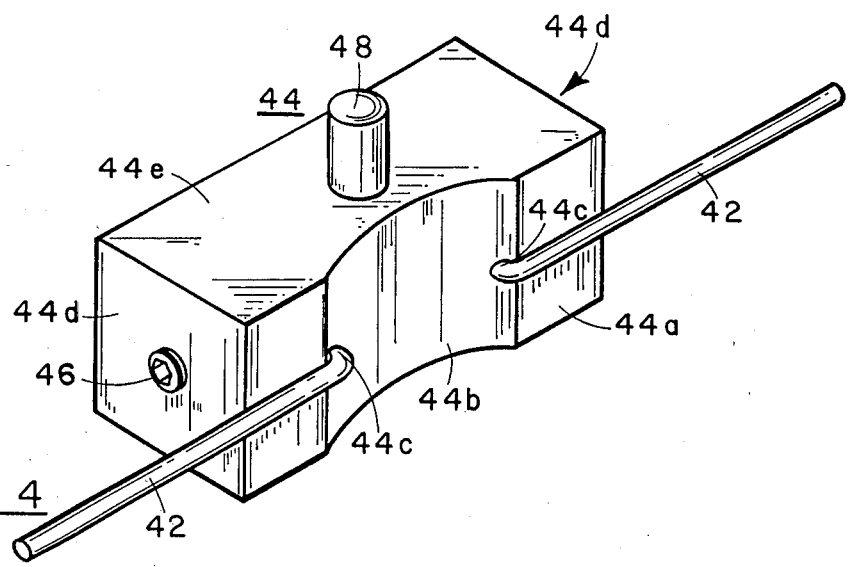
FIG. 4 is an isometric view of the cable clamp shown in FIG. 2.

As shown in FIGS. 2 and 4, the ends of cable 42 are joined by means of a cable clamp 44. As shown in greater detail in FIG. 4, cable clamp 44 is formed from a solid block of material, with one face 44a being designated as the inward face thereof. Two apertures 44c are formed in inward face 44a for insertion of the cable ends, one of such apertures 44c being formed near each end of clamp 44, and the edges of these apertures may be beveled so as to further reduce wear of the cable 42. These apertures 44c are located just inside the edges of a concave semi-cylindrical depression 44b formed in inward face 44a and having a radius about the same as the radius of pulley 40. Means are included in cable clamp 44 for retaining the ends of cable 42. Preferably these means include an aperture which is drilled and tapped in each end face 44d intersecting with the apertures 44c in inward face 44a into which the ends of cable 42 have been inserted. Set screws 46 are then inserted into the drilled and tapped apertures to hold the cable ends. Finally, a peg 48 is attached to or integrally formed in one side face 44e of cable clamp 44.

As can be seen in FIGS. 2 and 3, this peg 48 is pivotably attached to a lever arm 50 which in turn is pivotably attached to a trolley 52. Plow 28 is disposed on trolley 52 so as to plow silage off conveyor belt 22 as described above. Trolley 52 is generally rectangular in shape, having two crossmembers 54 and 56, one at each end, and two longitudinal members 58 and 60 running between and connecting the crossmembers. Notice that crossmember 56 as shown in FIG. 3 is a relatively straight member. Crossmember 54 is constructed the same way. Part of the purpose these crossmember is to change the cross-sectional shape of the belt 22 from concave, for carrying a large amount of feed, to flat, so that plow 28 can cleanly push all the feed off the belt and into bunk 14 (FIG. 1). At each end of each of the two crossmembers 54 and 56 is a means for accepting a support leg from a plow 28. In the embodiment shown in FIGS. 1, 2 and 3, this accepting means is a tube 62 attached to each end of each crossmember 54 and 56. Also in this embodiment, plow 28 is a flat plate-like member 28a having a leg 28b on each end. Each such leg 28b is made so as to fit into one of the tubes 62. The length of plate member 28a is such that tubes 62 located on diagonally opposite corners of trolley 52 are utilized. In this manner, as conveyor belt 22 brings silage 18 (FIG. 1) toward plow 28, a portion of belt 22 reaches crossmember 56 and its shape is changed from concave to flat. That portion of belt 22 than reaches plow 28 and, since the surface of belt 22 is flat at that point, plow 28, disposed diagonally, cleanly plows all the silage off the side of the conveyor. That portion of belt 22 then continues on past crossmember 54 and on to complete the loop. Since the belt 22 receives no direct support between crossmembers 54 and 56, any splices in belt 22 pass through by stretching belt 22 downward slightly and raising plow 18 slightly and thus problems associated with splices in prior art apparatus are avoided. Moreover, the side toward which the silage is pushed by the plow 28 can be switched manually merely by removing the plow 28 and replacing it in the tubes 62 which were not previously used. The purpose of this switching would be to effectuate "split-lot" feeding, in which two feeder bunks similar to bunk 14 of FIG. 1 are employed, one on each side of the conveyor, in order to increase the volume of livestock which can be fed by a particular length of conveyor, or possibly even to feed different rations to different groups of livestock.

Notice in FIGS. 1 and 2 that plow 28 rests on belt 22 which in turn rests on trolley 52, and that the plow 28 is thus caused to move back and forth along the conveyor from underneath the belt 22 by trolley 52. This solves a problem solved by different means in the above-described Patz patent, that is, the problem of conveyor belt retention caused by the fact that the plow forcing silage off one side of the conveyor exerts an opposite lateral force on the belt, tending to force the belt off frame 38 and misalign it. In the embodiment described above any lateral force exerted on belt 22 is transferred via legs 28b of plow 28 to longitudinal members 58 and 60 of trolley 52 and finally absorbed therefrom by frame 38. Hence any lateral movement of belt 22 and resulting misalignment is prevented. Accordingly, the upper surface of conveyor frame 38 is not flat but rather pointed at two places, one near each edge of the frame 38, and substantially lower in the center. That being the case, longitudinal members 58 and 60 of trolley 52 are also not flat. Rather, they are shaped to meet the upper surfaces of frame 38 so as to better absorb the lateral forces of belt 22 described above. In addition there is preferably placed between the upper surface of frame 38 and longitudinal members 58 and 60 a friction reduction means 64, such as polyethylene, polyvinyl or teflon for reducing friction between trolley 52 and frame 38 as trolley 52 moves back and forth. This friction reduction means 64 can be connected to the upper surface of frame 38 although it is generally economically preferable to attach it to the lower surfaces of the longitudinal members 58 and 60 of trolley 52.

As described above, back and forth movement of the plow 28 and trolley 52 along the conveyor is caused by the attachment of trolley 52, via arm 50 and cable clamp 44, to cable 42. Arm 50 is allowed to pivot only horizontally, thereby giving support to cable 42 so it continues to track cleanly and smoothly onto and off pulley 40. In the embodiment shown in FIG. 2, the change in the direction of movement of trolley 52 and plow 28 is accomplished by simply allowing cable clamp 44 to follow cable 42 around pulley 40 and an idler pulley (not shown) at the opposite end of the conveyor. Thus the purpose of depression 44b in the inner force 44a of cable clamp 44 described above is to provide smooth passage around pulley 40 without undue bending and flexing of cable 42 which would cause failure thereof. This is the reason that apertures 44c into which the ends of cable 42 are inserted are located within the edges of depression 44b as well as the reason that the edges of apertures 44c are beveled.

Figure 5A:
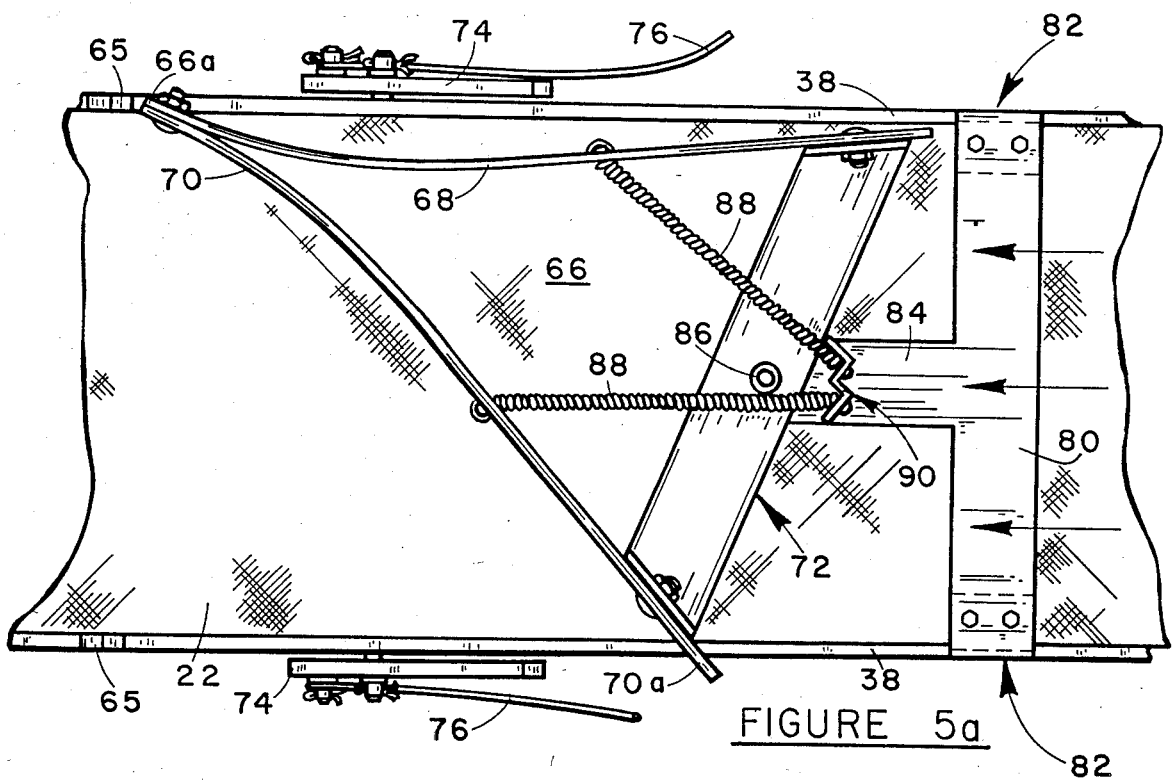
FIG. 5A is a top view of a plow and conveyor employed in another embodiment of the invention.
Figure 5B:
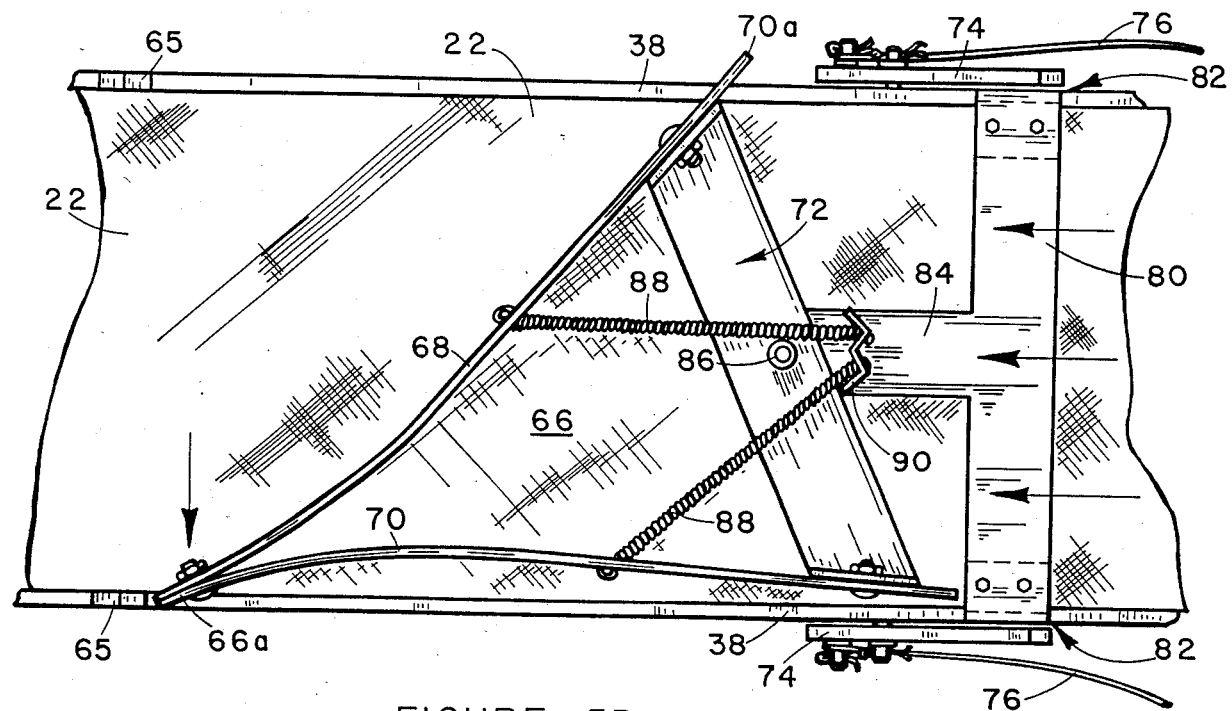
FIG. 5B is another top view similar to FIG. 5A, showing the plow in a different position.
Figure 6:
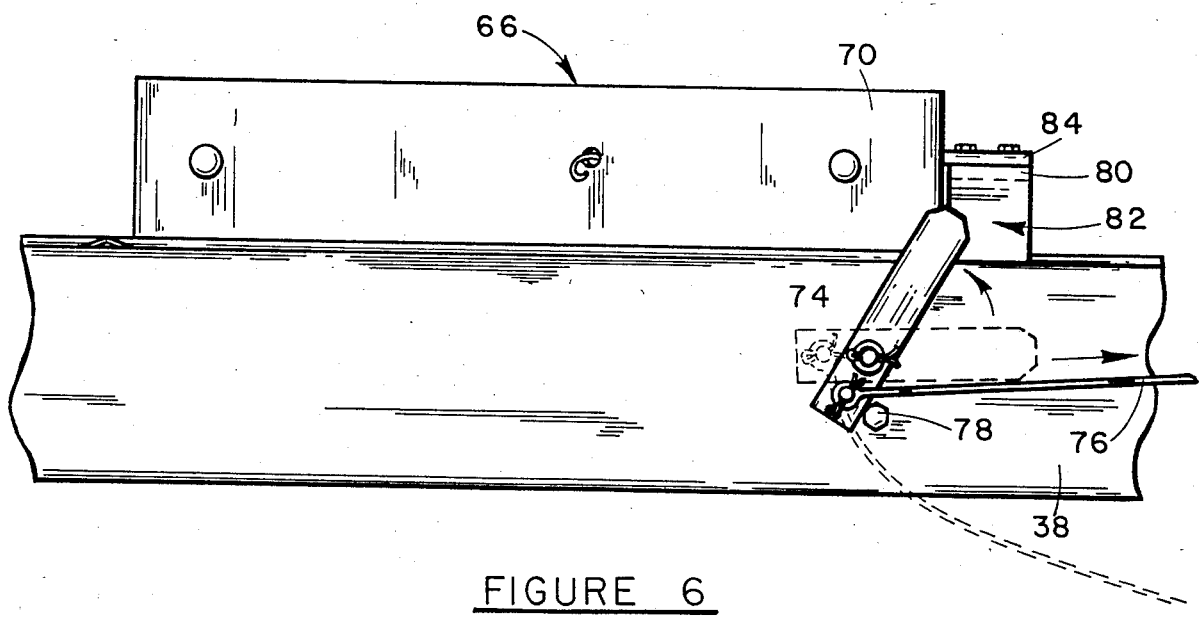
FIG. 6 is a side view of the embodiment shown in FIG. 5B.

Another embodiment of plow for forcing feed off one side of conveyor 10 is shown in FIGS. 5A, 5B and 6. This embodiment employs a trolley 65 which is very similar to trolley 52 disclosed in reference to FIGS. 1, 2 and 3. Trolley 65 still has longitudinal members joined by crossmembers, and all of these members still perform the same functions of transferring lateral force and changing the cross-section of the belt 22 from concave to flat, respectively, as described in reference to trolley 52 above. The difference lies in the manner in which a plow 66 is attached to trolley 65, as described below in reference to the over-center mechanism. The plow 66 shown in FIGS. 5A, 5B and 6 is designed to semi-automatically switch sides of the conveyor off which feed is pushed. Preferably, plow 66 includes two flat, plate-like members 68 and 70 which are secured together to form a point 66a at one end by any suitable means, and which are held separated to a distance just greater than the width of belt 22 at the opposite end by any suitable means such as a separation plate 72, bolted or welded between members 68 and 70. Thus an A-shaped plow is formed having two plow blades 68 and 70. Plow 66 is suitably affixed to trolley 65 such that it moves back and forth along the length of conveyor 10 similar to the motion described above for plow 28 shown in FIGS. 1, 2 and 3 with certain important differences. Plow 66 is pivotably affixed to trolley 65 by means of an over-center mechanism, such that the point 66a of plow 66 is always at one side or the other of the conveyor belt 22, pushing feed off the opposite side. The separation of the separated ends of blades 68 and 70 is such that when the point 66a of plow 66 is toward the side of one blade, the separated end of that blade is located over conveyor frame 38, while the separated end of the opposite blade extends beyond conveyor frame 38 on the opposite side. The particular side off which feed is plowed is switched when the operator activates one of latches 74. As shown in FIG. 6, when latches 74 are in the down position (shown in phantom), they do not affect plow 66. Latches 74 are rectangular members pivotably attached to the side of conveyor frame 38. A cord, spring or wire 76 is attached to one end of each latch 74 such that, when wire 76 is pulled, latch 74 pivots upward above the level of conveyor belt 22, to the position shown in solid lines in FIG. 6. Latch 74 is prevented from pivoting beyond that point by a stop means 78, such as a stud or peg protruding from the side of conveyor frame 38. When the operating means, such as an electrical or mechanical control system or even a human operator (not shown) receives a command to switch plow 66 or desires to switch plow 66, it simply pulls the wire 76 attached to the latch 74 on the side of frame 38 opposite where the point 66a of plow 66 is currently located. Hence in FIG. 5A the operator would pull the wire 76 attached to latch 74 at the bottom of the figure, since the point 66a of plow 66 is at the top of that figure. When the protruding portion 70a of blade 70 contacts latch 74, as plow 66 moves from right to left in that figure, protruding portion 70a is prevented from continuing in that direction, and the point 66a of plow 66 is thus caused to move across to the position shown in FIG. 5B. A portion of blade 68 then protrudes beyond the edge of conveyor frame 38 so that the plow 66 can be switched back again to the position shown in FIG. 5A by use of the procedure described above and upper latch 74.

As noted above, plow 66 is affixed to trolley 65 by means of an over-center mechanism. The purpose of the over-center mechanism is to ensure that the point 66a of plow 66 is always at one side or the other. The over-center mechanism includes a support plate 80 extending perpendicular to the length of conveyor 10, and having legs 82, one at each end therof, which attached to or formed integrally with one of the crossmembers of trolley 65. A tongue 84 is attached to or formed integrally with support plate 80 at about the center thereof and extends forward (that is, toward the point 66a of plow 66) therefrom. Near the forward end of tongue 84 is a peg 86 which fits in an aperture made for that purpose in separation plate 72 of plow 66, so that plow 66 pivots about peg 86. Each of two springs 88 are connected between blade 68 or 70 at one end and a spring-holding stud 90 at the opposite end, which studs 90 are affixed to or formed integrally with tongue 84. The attachment points of these springs 88 on both ends are located so that the spring 88 attached to the plowing blade (70 in FIG. 5A, 68 in FIG. 5B) passes almost directly over peg 86. This difference in distances between peg 86 and the two springs causes the two springs to exert a different moment or rotational force on plow 66 about peg 86, since the spring force alone does not change much between positions while the lever arm (the distance between peg 86 and the particular spring 88) does change substantially. Hence springs 88 function to ensure that the point 66a of plow 66 stays at one edge of belt 22 until a latch 74 is contacted. Spring-holding studs 90 may also double as stop means for preventing point 66a from moving too far to the side and possibly moving off belt 22.

Figure 7:
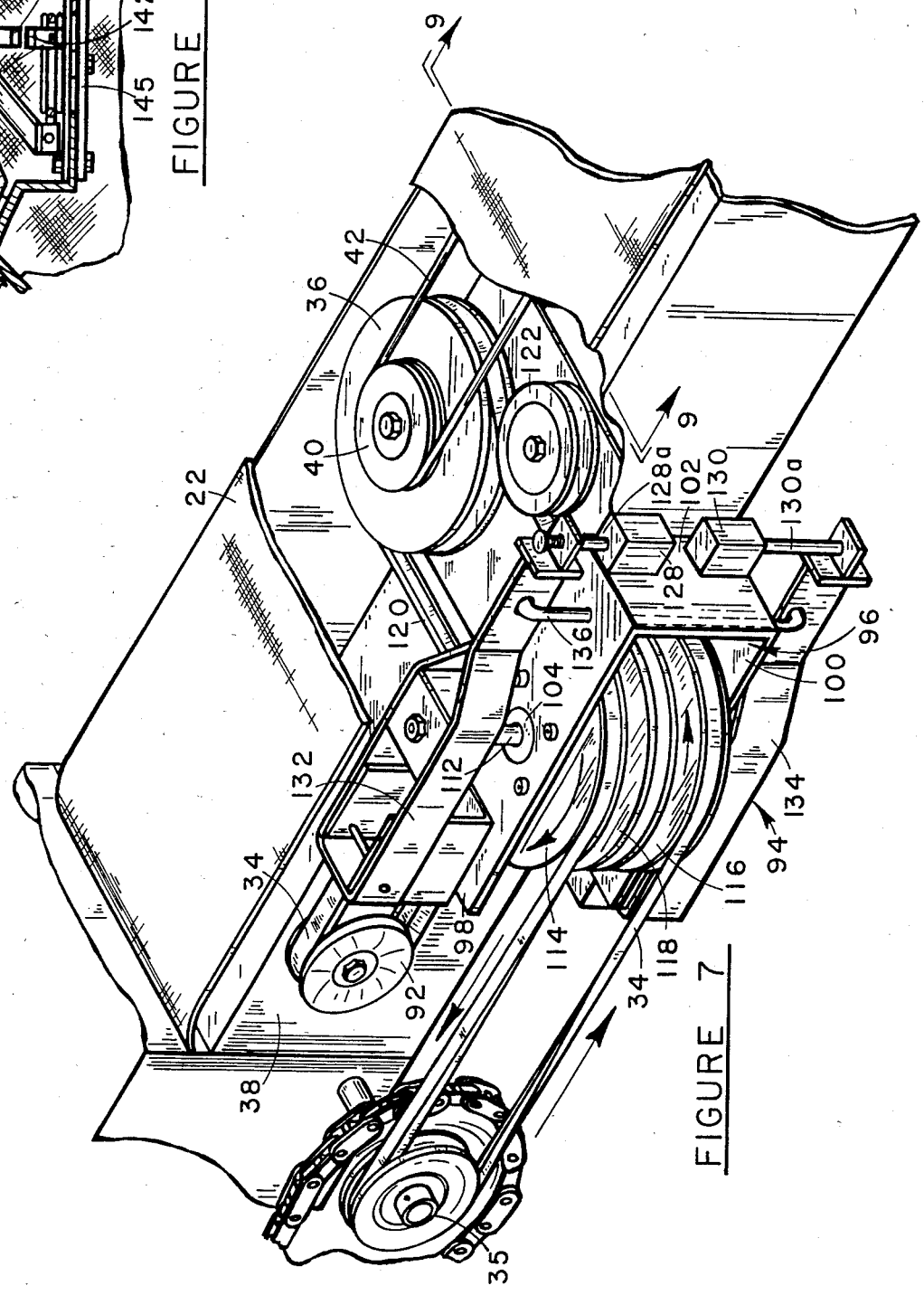
FIG. 7 is an isometric view of the trolley drive means employed in yet another embodiment of this invention.
Figure 8:
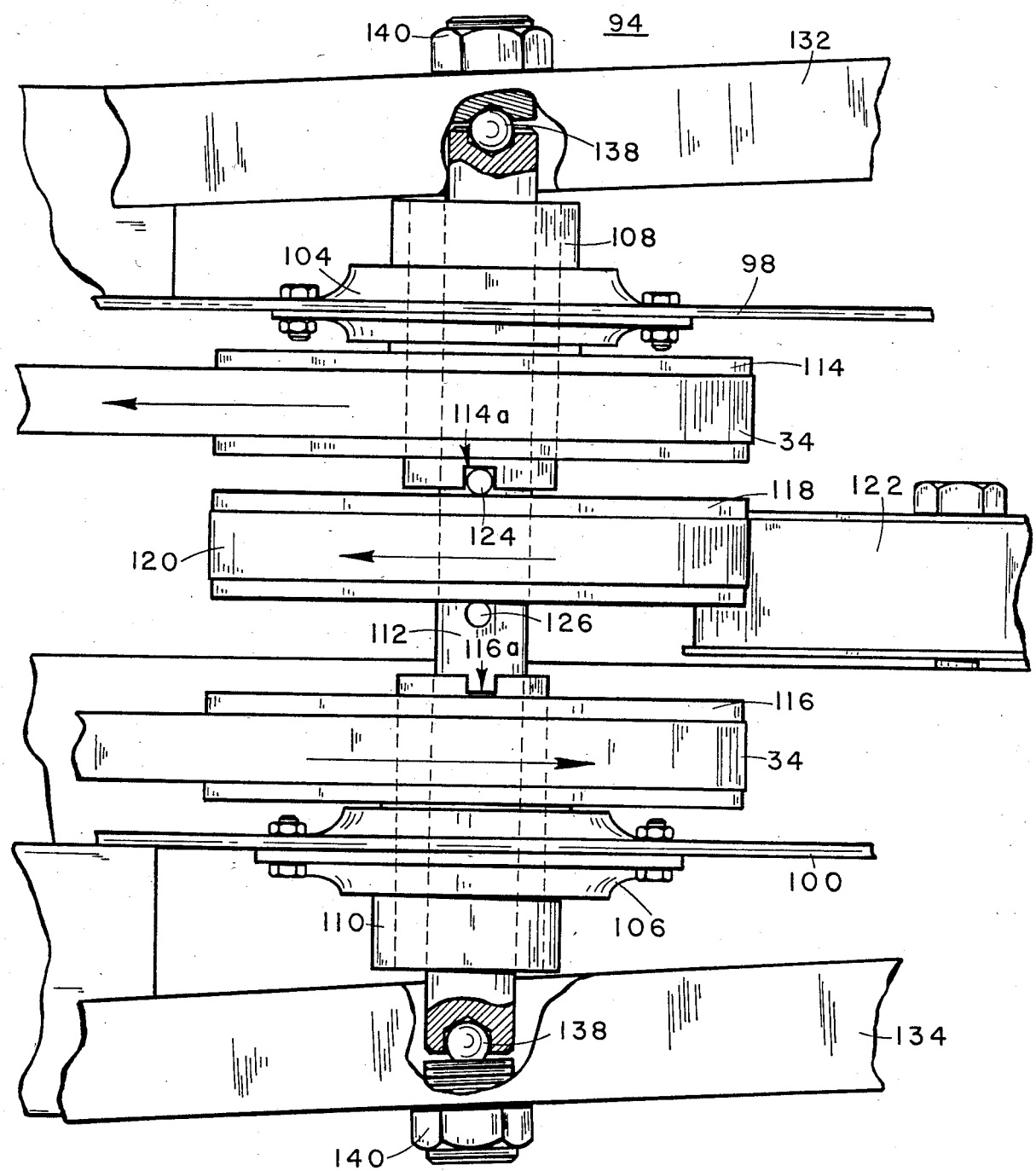
FIG. 8 is a side view of the trolley drive means shown in FIG. 7, having certain portions cut away.

Another embodiment for driving pulleys 36 and 40, and therefore cable 42 and trolley 52 or 65, is shown in FIGS. 7 and 8. The apparatus shown in those figures replaces pulleys 30 and 32 shown in FIGS. 1 and 3. Drive pulley 35 and master belt 34 are still used the same as shown in FIGS. 1 and 3 except that the end of master belt 34 opposite pulley 35 passes about an idler pulley 92 journaled to conveyor frame 38. The position of idler pulley 92 in frame 38 is adjustable by suitable means so that proper tension on master belt 34 can be maintained.

The drive assembly 94 as shown in isometric in FIG. 7 and in plan view in FIG. 8 can be described as follows, although the invention is not necessarily so limited. A drive frame 96 is attached to conveyor frame 38 and includes two parallel horizontal plates 98 and 100 extending outward from frame 38 and joined at one side by a vertical plate 102. An outer bearing means 104 and 106 is attached in an aperture formed in each of the horizontal plates 98 and 100. Within each outer bearing means 104 and 106 is an inner bearing means 108 and 110. A common shaft 112 runs through and extends beyond both inner bearing means 108 and 110, such that shaft 112 can turn freely with respect to inner bearing means 108 and 110, as well as slide lengthwise therein. In turn inner bearing means 108 and 110 can also turn freely with respect to outer bearing means 104 and 106. An upper pulley 114 is affixed to inner bearing means 108 while a lower pulley 116 is affixed to inner bearing means 110. A center pulley 118 is affixed to shaft 112 between upper pulley 114 and lower pulley 116. Since upper and lower pulley 114 and 116 are driven off the top and bottom respectively of the same pulley 35 by the same belt, master belt 34, these pulleys are always turning in opposite directions. That is, for example, if upper pulley 114 is turning clockwise, lower pulley 116 will be turning counter-clockwise, and vice versa. Center pulley 118 then takes its drive from either upper pulley 114 or lower pulley 116 via any suitable drive or clutch means. Center pulley 118 in turn drives pulley 36 via a slave belt 120 or other suitable drive means, with tensioning pulley 122 being positioned therebetween for maintaining proper tension in belt 120. Accordingly, as center pulley 118 takes its drive from upper pulley 114 or lower pulley 116, and its direction of rotation reverses, the direction of rotation of pulley 36 and also cable pulley 40 reverses, which in turn reverses the direction of movement of cable 42 and thus the movement of trolley 52 or 65 and the plow 28 or 66 attached thereto. In this manner, and employing suitable control means to control the drive or clutch means referred to above, the direction of movement of the plow can be controlled and reversed at various intervals along the length of conveyor 10, thus facilitating the use of a single feeder or conveyor 10 to deliver feed to a plurality of bunks, positioned along the length of the feeder, resulting in a multi-lot feeder.

In the preferred embodiment, as shown in FIGS. 7 and 8, the drive or clutch means includes at least one upper pin 124 (FIG. 8) affixed to or formed integrally with shaft 112 just above central pulley 118, and at least one lower pin 126 (FIG. 8) similarly associated with shaft 112 just below central pulley 118. A notch 114a and 116a is formed in the faces of each of the two pulleys 114 and 116 facing central pulley 118, corresponding to the number and size of pins 124 and 126. Each such notch has a ramp edge at the forward edge as the pulley rotates, and a step edge at the rear edge of the notch. The control means, then, governs the direction of rotation of central pulley 118 indirectly, by moving shaft 112 upward so that pin 124 engages notch 114a causing central pulley 118 to turn in the same direction as upper pulley 114 (FIG. 8), or by moving shaft 112 downward so that pin 126 engages notch 116a causing central pulley 118 to turn in the same direction as lower pulley 116.

Again in the preferred embodiment, as shown in FIGS. 7 and 8, the control means for moving shaft 112 up and down as described above includes upper and lower solenoids 128 and 130 (FIG. 7) attached to vertical plate 102. These solenoids act on upper and lower lever arms 132 and 134 respectively. Each of these two lever arms 132 and 134 is pivotably attached to upper and lower horizontal plates 98 and 100 respectively via suitable brackets. To ensure that the pivotable ends of lever arms 132 and 134 move up and down in unison, a connector 136 (FIG. 7) is provided, which hooks into the lever arms near the point where they are connected to solenoid plungers 128a and 130a respectively. Between its pivot point and its respective solenoid, each lever arm 132 and 134 is connected to shaft 112 by suitable connecting means which allow rotational movements as well as bending. One example of such a connecting means is shown in FIG. 8 wherein a ball bearing 138 is held between a bolt 140 connected to each lever arm and the respective end of shaft 112.

Figure 9:
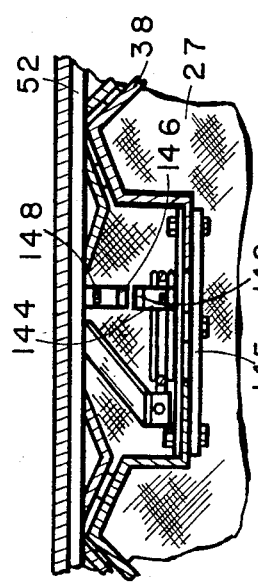
FIG. 9 is a partial sectional view of FIG. 7 taken along line 9—9 to show the microswitches and magnet.

The solenoids 128 and 130 are activated by microswitches 142 (FIG. 9) placed at intervals along the length of feeder 10, attached to frame 38 via brackets 144, in turn attached to spanner 145, which holds the two sides of frame 38 together periodically along the length of conveyor 10. These microswitches 142 are switched momentarily by proximity to a magnet 146 attached to trolley 52 or 65 via another bracket 148, as magnet 146 passes near microswitch 142. A plurality of such microswitches 142 can be arranged along the length of feeder 10 to determine the points at which the direction of the trolley reverses. Conventional control relays (not shown) determine which switches 142 affect which solenoids so that the feed is plowed off the conveyor into the proper feeder bunk as intended by the operator.

While the apparatus hereinbefore described is effectively adapted to fulfill the aforesaid objects, it is to be understood that the invention is not intended to be limited to the particular preferred embodiments of livestock feeder apparatus herein set forth. Rather, the invention as a whole is to be taken as including various equivalents without departing from the scope of the appended claims.

What is claimed is:

1. A feed conveyor for depositing livestock feed uniformly in one or more feeder bunks, comprising:
   conveyor means including a conveyor belt having an upper support surface and driving means for driving said conveyor belt;
   means for supporting said conveyor means generally over the feeder bunks;
   means for depositing livestock feed on the upper support surface of said conveyor means; and
   means for plowing feed off the upper support surface of said conveyor means and into the feeder bunk, including:
   a plow having at least two blade surfaces resting on the upper support surface of said conveyor belt, said two blades joined to form a point at one end and separated by separation means at the opposite end to greater than the width of said conveyor means;
   trolley means positioned directly under said plow and the surface of said conveyor belt and connected to said plow for moving said plow back and forth along the length of said conveyor belt;
   cable means attached to said trolley and reeved about two cable pulleys, one disposed at each end of said conveyor means, said cable means and cable pulleys positioned below said trolley but above the lower return surface of said conveyor belt, and the two flights of said cable means and cable pulleys oriented in a horizontal plane, one of said cable pulleys being driven by the same driving means which drives said conveyor means;
   wherein said plow is pivotably connected to a plate which in turn connects to said trolley means and including over-center means for holding the point of said plow toward the nearest side of said conveyor belt;
   further comprising means for switching the point of said plow to the opposite side of said conveyor belt;
   wherein the blade of said plow opposite the side toward which the point of said plow points protrudes beyond the side of said conveyor means and wherein said point moving means includes a latch attached to one side of said conveyor which can be raised so as to contact said protruding portion of said plow blade such that said plow pivots and said plow point switches to the opposite side of said conveyor belt.

2. A conveyor as recited in claim 1 wherein said trolley means is pivotably connected to said cable means via a lever arm which, at the point where the direction of movement of said trolley means changes, moves only laterally in a horizontal plane.

3. A conveyor as recited in claim 2 wherein said cable means includes a cable terminating at both ends in a cable end and cable clamp means for joining said two cable ends together,
   said clamp means comprising a solid block of material having one face thereof defined as the inner face, having a concave cylindrical depression being approximately the same as the radius of said two pulleys, and having means for attaching said cable ends to said clamp means just inside the edges of said depression.

4. A conveyor as recited in claim 3 wherein said means for attaching said cable ends to said clamp means includes apertures formed in said clamp means just inside the edges of said depression for receiving said cable ends and set screw means for securing said cable ends in said apertures.

5. A conveyor as recited in claim 4 wherein said clamp means further comprises a peg pivotably attached to said trolley means for moving said trolley means back and forth along the length of said conveyor means.

6. A conveyor as recited in claim 1 wherein said over-center means of said plow includes spring means attached at one end thereof to at least one of said plow blades and attached at the other end thereof to said plate beyond the pivot point of said plow such that the moment exerted by said spring means forces the point of said plow to the nearest side of said conveyor belt.

7. A conveyor as recited in claim 6 wherein said conveyor belt driving means includes rollers over which said conveyor belt is reeved, a prime mover, and means for connecting said prime mover to said rollers and reducing the
   wherein said connecting and reducing means is oriented in a vertical plane; and
   further comprising means for converting said vertically oriented connecting and reducing means to a horizontal plane for driving said pulleys and said cable means.

8. A conveyor as recited in claim 7 wherein said connecting and reducing means includes at least one vertically oriented pulley; and
   wherein said converting means includes a master belt driven by said vertically oriented pulley, said master belt being reeved on a pair of horizontal pulleys which in turn drive said one of said cable pulleys.

9. A conveyor as recited in claim 8 wherein said pair of horizontal pulleys turn on a common shaft and having a third pulley located therebetween also turning on the same shaft, which third pulley is driven first by one and then by the other of said pair of horizontal pulleys by clutch means, thereby turning first in one direction and then in the other respectively, so as to cause said cable means, trolley means and plow to move in first one direction and then the other within the length of said conveyor means.

10. A conveyor as recited in claim 9 further comprising switches located along the length of said conveyor means for activating said clutch means, thereby causing a change in the direction of movement of said cable means, trolley means and plow.

11. A conveyor as recited in claim 10 wherein said switches are activated by proximity to said trolley means.

12. A conveyor as recited in claim 1 wherein said cable means includes a cable terminating at both ends in a cable end and cable clamp means for joining said two cable ends together,
    said clamp means comprising a solid block of material having one face thereof defined as the inner face, having a concave cylindrical depression formed at the center of said inner face, the radius of said depression being approximately the same as the radius of said two pulleys, and having means for attaching said cable ends to said clamp means just inside the edges of said depression.

13. A conveyor as recited in claim 12 wherein said means for attaching said cable ends to said clamp means includes apertures formed in said clamp means just inside the edges of said depression for receiving said cable ends and set screw means for securing said cable ends in said apertures.

14. A conveyor as recited in claim 13 wherein said clamp means further comprises a peg pivotably attached to said trolley means for moving said trolley means back and forth along the length of said conveyor means.

15. A conveyor as recited in claim 14 wherein said trolley means is pivotably connected to said peg via a lever arm which, at the point where the direction of movement of said trolley means changes, moves only laterally in a horizontal plane.

16. A conveyor as recited in claim 15 wherein said plow has one diagonal blade surface the orientation of which can be changed by removing it and reattaching it to said trolley so as to allow the side of the conveyor off which feed is plowed to be changed.

17. A conveyor as recited in claim 16 wherein said plow has two blades joined to form a point at one end and separated by separation means at the opposite end to greater than the width of said conveyor means.

18. A conveyor as recited in claim 17 wherein said plow is pivotably connected to a plate which in turn connects to said trolley means and including over-center means for holding the point of said plow toward the nearest side of said conveyor belt.

19. A conveyor as recited in claim 18 further comprising means for switching the point of said plow to the opposite the side of said conveyor belt.

20. A conveyor as recited in claim 19 wherein the blade of said plow opposite the side toward which the point of said plow points protrudes beyond the side of said conveyor means and wherein said point moving means includes a latch attached to one side of said conveyor which can be raised so as to contact said protruding portion of said plow blade such that said plow pivots and said plow point switches to the opposite side of said conveyor belt.

21. A conveyor as recited in claim 20 wherein said over-center means of said plow includes spring means attached at one end thereof to at least one of said plow blades and attached at the other end thereof to said plate beyond the pivot point of said plow such that the moment exerted by said spring means forces the point of said plow to the nearest side of said conveyor belt.

22. A conveyor as recited in claim 21 wherein said conveyor belt driving means includes rollers over which said conveyor belt is reeved, a prime mover, and means for connecting said prime mover to said rollers and reducing the speed thereof;
wherein said connecting and reducing means is oriented in a vertical plane; and
further comprising means for converting said vertically oriented connecting and reducing means to a horizontal plane for driving said pulleys and said cable means.

23. A conveyor as recited in claim 22 wherein said connecting and reducing means includes at least one vertically oriented pulley; and
wherein said converting means includes a master belt driven by said vertically oriented pulley, said master belt being reeved on a pair of horizontal pulleys which in turn drive said one of said cable pulleys.

24. A conveyor as recited in claim 23 wherein said pair of horizontal pulleys turn on a common shaft and having a third pulley located therebetween also turning on the same shaft, which third pulley is driven first by one and then by the other of said pair of horizontal pulleys by clutch means, thereby turning first in one direction and then in the other respectively, so as to cause said cable means, trolley means and plow to move in first one direction and then the other within the length of said conveyor means.

25. A conveyor as recited in claim 24 further comprising switches located along the length of said conveyor means for activating said clutch means, thereby causing a change in the direction of movement of said cable means, trolley means and plow.

26. A conveyor as recited in claim 25 wherein said switches are activated by proximity to said trolley means.

27. A conveyor as recited in claim 1 wherein the blade of said plow opposite the side toward which the point of said plow points protrudes beyond the side of said conveyor means and wherein said point moving means includes a latch attached to one side of said conveyor which can be raised so as to contact said protruding portion of said plow blade such that said plow pivots and said plow point switches to the opposite side of said conveyor belt.

28. A conveyor as recited in claim 27 wherein said over-center means of said plow includes spring means attached at one end thereof to at least one of said plow blades and attached at the other end thereof to said plate beyond the pivot point of said plow such that the moment exerted by said spring means forces the point of said plow to the nearest side of said conveyor belt.

29. A conveyor as recited in claim 28 wherein said conveyor belt driving means includes rollers over which said conveyor belt is reeved, a prime mover, and means for connecting said prime mover to said rollers and reducing the speed thereof;
wherein said connecting and reducing means is oriented in a vertical plane; and
further comprising means for converting said vertically oriented connecting and reducing means to a horizontal plane for driving said pulleys and said cable means.

30. A conveyor as recited in claim 29 wherein said connecting and reducing means includes at least one vertically oriented pulley; and
wherein said converting means includes a master belt driven by said vertically oriented pulley, said master belt being reeved on a pair of horizontal pulleys which in turn drive said one of said cable pulleys.

31. A conveyor as recited in claim 30 wherein said pair of horizontal pulleys turn on a common shaft and having a third pulley located therebetween also turning on the same shaft, which third pulley is driven first by one and then by the other of said pair of horizontal pulleys by clutch means, thereby turning first in one direction and then in the other respectively, so as to cause said cable means, trolley means and plow to move in first one direction and then the other within the length of said conveyor means.

32. A conveyor as recited in claim 31 further comprising switches located along the length of said conveyor means for activating said clutch means, thereby causing a change in the direction of movement of said cable means, trolley means and plow.

33. A conveyor as recited in claim 32 wherein said switches are activated by proximity to said trolley means.

34. A conveyor as recited in claim 1 wherein said conveyor belt driving means includes rollers over which said conveyor belt is reeved, a prime mover, and means for connecting said prime mover to said rollers and reducing the speed thereof;

wherein said connecting and reducing means is oriented in a vertical plane; and further comprising means for converting said vertically oriented connecting and reducing means to a horizontal plane for driving said pulleys and said cable means.

35. A conveyor as recited in claim 34 wherein said connecting and reducing means includes at least one vertically oriented pulley; and wherein said converting means includes a master belt driven by said vertically oriented pulley, said master belt being reeved on a pair of horizontal pulleys which in turn drive said one of said cable pulleys.

36. A conveyor as recited in claim 35 wherein said pair of horizontal pulleys turn on a common shaft and having a third pulley located therebetween also turning on the same shaft, which third pulley is driven first by one and then by the other of said pair of horizontal pulleys by clutch means, thereby turning first in one direction and then in the other respectively, so as to cause said cable means, trolley means and plow to move in first one direction and then the other within the length of said conveyor means.

37. A conveyor as recited in claim 36 further comprising switches located along the length of said conveyor means for activating said clutch means, thereby causing a change in the direction of movement of said cable means, trolley means and plow.

38. A conveyor as recited in claim 37 wherein said switches are activated by proximity to said trolley means.

39. A feed conveyor for depositing livestock feed uniformly in one or more feeder bunks, comprising:

conveyor means including a conveyor belt having a concave upper support surface and driving means for driving said conveyor belt;

means for supporting said conveyor means generally over the feeder bunks;

means for depositing livestock fed on the upper support surface of said conveyor means; and means for plowing feed off the upper support surface of said conveyor means and into the feeder bunk; including:

a plow having at least one diagonal blade surface resting on the upper support surface of said conveyor belt;

trolley means positioned directly under said plow and the surface of said conveyor belt and connected to said plow for flattening the concave upper surface of said belt so as to allow the plow to cleanly push the feed into the feeder bunks, and for moving said plow back and forth along the length of said conveyor belt;

cable means attached to said trolley and reeved about two cable pulleys, one disposed at each end of said conveyor means, said cable means and cable pulleys positioned below said trolley but above the lower return surface of said conveyor belt, and the two flights of said cable means and cable pulleys oriented in a horizontal plane, one of said cable pulleys being driven by the same driving means which drives said conveyor means.

40. A conveyor as recited in claim 39 wherein said trolley means is pivotably connected to said cable means via a lever arm which, at the point where the direction of movement of said trolley means changes, moves only laterally in a horizontal plane.

41. A conveyor as recited in claim 40 wherein said cable means includes a cable terminating at both ends in a cable end and cable clamp means for joining said to cable ends together, said clamp means comprising a solid block of material having one face thereof defined as the inner face, having concave cylindrical depression formed at the center of said inner face, the radius of said depression being approximately the same as the radius of said two pulleys, and having means for attaching said cable ends to said clamp means just inside the edges of said depression.

42. A conveyor as recited in claim 41 wherein said means for attaching said cable ends to said clamp means includes apertures formed in said clamp means just inside the edges of said depression for receiving said cable ends and set screw means for securing said cable ends in said apertures.

43. A conveyor as recited in claim 42 wherein said clamp means further comprises a peg pivotably attached to said trolley means for moving said trolley means back and forth along the length of said conveyor means.

* * * * *